United States Patent
Schäfer et al.

(10) Patent No.: US 8,453,532 B2
(45) Date of Patent: Jun. 4, 2013

(54) METHOD FOR SETTING THE TOOTH FACE POSITION OF A GEAR WHEEL

(75) Inventors: Lothar Schäfer, Villmar (DE); Horst Wawro, Bochum (DE)

(73) Assignee: Jahnel-Kestermann Getriebewerke GmbH & Co. KG, Bochum (DE)

( * ) Notice: Subject to any disclaimer, the term of this patent is extended or adjusted under 35 U.S.C. 154(b) by 287 days.

(21) Appl. No.: 12/922,265

(22) PCT Filed: Dec. 18, 2008

(86) PCT No.: PCT/DE2008/002132
§ 371 (c)(1),
(2), (4) Date: Sep. 13, 2010

(87) PCT Pub. No.: WO2009/112003
PCT Pub. Date: Sep. 17, 2009

(65) Prior Publication Data
US 2011/0017004 A1    Jan. 27, 2011

(30) Foreign Application Priority Data
Mar. 12, 2008  (DE) .......................... 10 2008 013 983

(51) Int. Cl.
*F16H 1/20* (2006.01)
(52) U.S. Cl.
USPC .......................................... 74/421 R; 74/410
(58) Field of Classification Search
USPC .................. 74/406, 412 R, 413, 420, 421 A, 74/421 R, 434, 457, 459.5
See application file for complete search history.

(56) References Cited

U.S. PATENT DOCUMENTS

| | | | | |
|---|---|---|---|---|
| 2,980,474 A | * | 4/1961 | Gargan | 384/559 |
| 4,225,296 A | * | 9/1980 | Haupt | 418/206.2 |
| 4,414,859 A | * | 11/1983 | Holthoff | 74/417 |
| 6,619,157 B1 | * | 9/2003 | Morrow | 74/665 GD |
| 6,666,103 B2 | * | 12/2003 | Gotoh | 74/412 R |
| 7,669,494 B2 | * | 3/2010 | Bader | 74/331 |
| 2005/0011307 A1 | * | 1/2005 | Gmirya | 74/665 GA |
| 2008/0127761 A1 | * | 6/2008 | Mineshima | 74/413 |

FOREIGN PATENT DOCUMENTS
DE  30 01 342 A  7/1981
EP  1 318 329 A  6/2003

* cited by examiner

*Primary Examiner* — Troy Chambers
*Assistant Examiner* — Rachel Gude
(74) *Attorney, Agent, or Firm* — Henry M. Feiereisen LLC

(57) ABSTRACT

The invention relates to a method for setting the tooth face position of a gear wheel (2), which is non-positively connected to a double-skewed pinion shaft (1). A hydraulic press fit (4, 4a) is formed between the gear wheel (2) and pinion shaft (1) for relieving a non-positive connection of the gear wheel (2) shrink-fitted onto the pinion shaft (1). The setting is carried out by determining a tooth face apex point (A) of the double-skew of the pinion shaft (1). A radial plane (E) with a predetermined axial offset (AV) from the tooth face apex point (A) and a radial offset (RV) with respect to the tooth face apex point (A) are defined. The intersecting point (S) of a tooth face (11) of the gear wheel (2) must be located with the predetermined radial offset (RV) in the radial plane (E). Such a pinion shaft (1) is used, in particular, in a power-splitting spur gearbox (12), wherein an input shaft is in multiple engagement with several pinion shafts (1) via a double-skew, wherein the gear wheels (2) of the pinion shafts (1) are in turn in multiple engagement with a common driven shaft (15).

13 Claims, 2 Drawing Sheets

METHOD FOR SETTING THE TOOTH FACE POSITION OF A GEAR WHEEL

CROSS-REFERENCES TO RELATED APPLICATIONS

This application is the U.S. National Stage of International Application No. PCT/DE2008/002132, filed Dec. 18, 2008, which designated the United States and has been published as International Publication No. WO 2009/112003 and which claims the priority of German Patent Application, Serial No. 10 2008 013 983.1, filed Mar. 12, 2008, pursuant to 35 U.S.C. 119(a)-(d).

BACKGROUND OF THE INVENTION

The invention relates to a method for setting the tooth face position of a gear wheel, which is non-positively connected to a double-skewed pinion shaft, the use of such pinion shaft in a torque-split spur gear, as well as a spur gear with such pinion shaft.

It is known to assemble pinion shafts, on which a gear wheel with a larger diameter is to be arranged, not from a single component, but rather from several components. The gear wheel can hereby be affixed on the pinion shaft positively or non-positively. In a non-releasable, non-positive connection the gear wheel is initially heated, i.e., thermally expanded, wherein the pinion shaft is cooled. If necessary, a friction coating made, for example, of carborundum is applied on the shaft seat for increasing the friction resistance. The joining process is performed with a joining device, so that the tooth faces of the gear wheel assume a defined position with respect to the tooth faces of the double-skew of the pinion shaft. However, it has been observed in practice, that the required precision is sometimes not obtained. The reasons are not only manufacturing-related deviations of the components to be joined, but also thermally-induced deviations resulting from heating and cooling. Deviations due to manual intervention have also been observed, caused in the assembly process when the components manual joined.

This type of non-positive connections does no longer allow larger corrections of the position of the tooth faces. To attain the required precision, an additional manufacturing process involving grinding of the tooth faces is required. Very large gear wheels may require compensation of deviations of greater than 1 mm. The post-processing is associated with significant costs. Although it is theoretically possible to leave a sizeable amount of overmeasure on the tooth faces, which would reduce the risk that the tooth faces are ground too thin if the gear wheel having an imprecision exceeding the tolerance needed to be ground down further, this approach is uneconomical. Moreover, this approach causes problems with the hardness of the tooth faces, because the previously hardened tooth faces have a limited hardening depth. For this reason, the gear wheel must be very precisely positioned on the pinion shaft in order to minimize post-machining, i.e., grinding.

It is a necessary to exactly position the gear wheel on the pinion shaft, in particular, when the pinion shaft is to be employed in a torque-split spur gear where the two gear wheels of the pinion shafts are in common engagement with a pinion of a driven shaft. If there are deviations in the position of the tooth faces, this multiple engagement may cause an unequal load distribution and hence unequal load carrying characteristics of the teeth, which undesirably increases wear of the gear.

SUMMARY OF THE INVENTION

It is therefore an object of the invention to provide a method for setting the tooth face position of a gear wheel, which is non-positively connected with a double-skewed pinion shaft, by which the costs for the post-machining of the tooth faces can be reduced and the product quality, in particular with respect to the load distribution, can be improved.

In addition, a torque-split spur gear is disclosed in which the position of the tooth faces of a gear wheel that is non-positively affixed on a pinion shaft can be better adjusted.

According to one aspect of the invention, a method for setting the tooth face position of a gear wheel, which is non-positively connected to a double-skewed pinion shaft, includes the steps of: a) implementing a shaft seat arranged between the gear wheel and pinion shaft as a hydraulic press fit, b) forming a non-positive connection between the gear wheel and the pinion shaft by shrink-fitting the gear wheel onto the shaft seat, c) determining a tooth face apex point of the double-skew of the pinion shaft, d) defining a radial plane extending through the teeth of the gear wheel and being located with a predetermined axial offset from the tooth face apex point, e) determining the intersecting point of a tooth face of the gear wheel with the radial plane, f) applying pressure to the hydraulic press fit so that the gear wheel can be rotated relative to the pinion shaft, q) rotating the gear wheel into a position where the intersecting point is located in a predetermined radial offset with respect to the tooth face apex point, h) relieving pressure from the hydraulic press fit so as to affix the gear wheel on the shaft seat with a rotation lock.

According to another aspect of the invention, a method for setting the tooth face position of a gear wheel, which is non-positively connected to a double-skewed pinion shaft, wherein the pinion shaft is installed in a torque-split spur gear, wherein the two gear wheels of two torque-split pinion shafts are in common engagement with a pinion of a driven shaft, includes the steps of: a) determining a tooth face apex point of the double-skew of the pinion shaft, b) defining a radial plane extending through the teeth of the gear wheel and being located with a predetermined axial offset from the tooth face apex point, c) determining an intersecting point of a tooth face of the gear wheel with the radial plane, d) removing a non-positive connection between the gear wheel and the pinion shaft by applying pressure to a hydraulic press fit in a region of the shaft seat of the gear wheel, so that the gear wheel can be rotated relative to the pinion shaft, e) rotating the gear wheel into a position where the intersecting point is located in a predetermined radial offset with respect to the tooth face apex point, f) relieving pressure from the hydraulic press fit so as to affix the gear wheel on the shaft seat with a rotation lock.

According to yet another aspect of the invention, a torque-split spur gear includes a drive shaft which is in multiple engagement via a double-skew with several pinion shafts, wherein each pinion shaft has a gear wheel and wherein a pinion of a driven shaft is in multiple engagement with two gear wheels of two pinion shafts, wherein the gear wheels are non-positively affixed on the pinion shaft by forming a hydraulic press fit.

In the method of the invention, a shaft seat is formed between the gear wheel and the pinion shaft, which is configured as hydraulic press fit. The connection between the gear wheel and the pinion shaft is implemented non-positively as before, with the gear wheel being shrunk-fit on the pinion shaft. The effect of the warpage of the components caused by cooling and/or heating is compensated by subsequently correcting the face position of the gear wheel. This is accomplished with the hydraulic press fit.

The position of the tooth face of the gear wheel is corrected based on the position of a tooth face apex point of the double-skew of the pinion shaft. This tooth face apex point is formed by the intersection of the lines extending along the tooth faces of the double-skew. This tooth face apex point exists in most situations only virtually, because the two gears of the pinion shaft are not in contact with one another. The tooth structure of the pinion shaft can be arranged symmetrically and/or asymmetrically with respect to the axial line of the pinion shaft. The tooth face apex point of the pinion shaft is a measure for the position of the tooth faces of the gear wheel. No or only very small deviations (<0.02 mm) from this tooth face apex point should exist To determine the position of the tooth faces of the gear wheel, a fictive radial plane is placed through the teeth of the gear wheel. This radial plane is located in a predetermined axial offset from the tooth face apex point. Each tooth face of the gear wheel intersects this radial plane in an intersecting point. The intersecting point has, depending on the position of the tooth face, a radial offset to the tooth face apex point. The amount of radial offset of the intersecting point of the tooth face is predetermined by the structure. Therefore, the position of the intersecting point is corrected by applying pressure to the hydraulic press fit in order to rotate the gear wheel with respect to the pinion shaft. After the intersecting point is arranged with a predetermined radial offset relative to the tooth face apex point, the hydraulic press fit is relieved in order to affix the gear wheel on the shaft seat with a rotation lock.

In this way, scrap and post-machining of the tooth faces can be minimized, thereby reducing manufacturing costs. The product quality is improved even with the reduced manufacturing costs. Advantageously, the entire method can be performed within a controlled process, allowing a reproducible high-precision adjustment already during the preparation of the components to be joined before the final grinding process.

It will be understood that after the processing step b), i.e. after a non-positive connection is formed between the gear wheel and the pinion shaft by shrink-fitting the gear wheel on the shaft seat, the joined components must be cooled to a reference temperature (20° C.) before the gear wheel is aligned on the pinion shaft. Although a hydraulic press fit causes hydraulic expansion of the joint seat by abolishing the non-positive connection with a hydrodynamic lubrication film, these changes do not cause changes in the region of the tooth faces of gear wheels which typically have a considerable radial distance from the joint seat. Even if the gear wheel is moved manually or mechanically with a defined force into the desired position by applying pressure to the hydraulic press fit, relieving the hydraulic press fit does not cause an undesirable deformation in the region of the tooth faces.

The method of the invention cannot only be used for producing individual double-skewed pinion shafts to be provided with gear wheels, but also in situations where such double-skewed pinion shaft is already installed in a spur gear.

The adjustability is particularly advantageous if the pinion shaft is to be installed in a torque-split spur gear, where the two gear wheels of two torque-split pinion shafts are in common engagement with a pinion of a driven shaft. In this type of gear, a uniform load distribution across both pinion shafts is desired. This presumes that the torque-split pinion shafts are able to transfer the power evenly via their respective gear wheels to the pinion of the driven shaft. The tooth faces of both gear wheels must therefore have a defined position with respect to the tooth faces of the corresponding skewed teeth of the pinion shaft and also with respect to the pinion of the driven shaft. To attain this condition with the required precision, a tooth face apex point of the double-skewed gear of at least one pinion shaft is determined and a radial plane extending through the teeth of the gear wheel is defined, which has a predetermined axial offset from the tooth face apex point. As described above, the intersecting point of a tooth face of the gear wheel with the radial plane is determined and the gear wheel is, by applying pressure on a hydraulic press fit, rotated into a position where the intersecting point has a predetermined radial offset with respect to the tooth face apex point, in order to subsequently relieve the hydraulic press fit and to affix the gear wheel on the shaft seat with a rotation lock. Unlike with the first method, in this case the tooth face apex point is also used as reference quantity; however, the tooth faces are already finish-machined, in particular ground and polished. With the method according to claim 1, the subsequent machining is performed after alignment of the tooth faces. Of course, the method according to claim 1 does not exclude a subsequent repeated application of pressure to the hydraulic press fit to rotate the gear wheel to a new position, if required.

The tooth face apex point is determined from the load tooth faces. Likewise, the intersecting point is determined based on a load tooth face of the gear wheel.

The skewed pinion shafts produced according to the invention are employed, in particular, in a torque-split spur gear, where the two gear wheels of both pinion shafts are a common engagement with a pinion of a driven shaft. Under realistic conditions, deviations in the so-called timing, i.e., the position of the load tooth face of the gear wheel, have a direct effect on the contact between teeth and hence the load distribution of all participating gear pairs. Typically, structural load compensation is performed to compensate deviations made up of tolerances, deformations and stiffness, which cannot be taken into consideration at all or only imprecisely. Elastic or articulated structural component are used for load compensation. To compensate for displacements, in particular load-related deformations, the gears have geometric ground surfaces for load-correction. The invention does not preclude, in particular, ground surfaces for load-correction caused by load-related deformation.

The subject matter of claim 6 is a torque-split spur gear with a drive shaft which is in multiple engagement with several pinion shafts via a double-skew. Each pinion shaft has a gear wheel, wherein a pinion of a driven shaft is in multiple engagement with two gear wheels of two pinion shafts. According to the invention, the gear wheels of the pinion shafts of the torque-split spur gear are non-positively affixed on the pinion shaft by forming a hydraulic press fit. As described above, the hydraulic press fit allows later alignment of the teeth of the gear wheel with respect to the double-skew of the pinion shaft to realize uniform load distribution.

The position of a tooth face of a gear wheel in the spur gear of the invention depends on the position of a tooth face apex point of the tooth faces of the double-skew. The tooth face apex point is the load tooth face apex point.

In a practical embodiment of the hydraulic press fit, either the shaft seat of the pinion shaft or the gear wheel are provided with hydraulic channels so as to press a hydraulic fluid into the joint seat.

The advantages of the invention are particularly evident when a plurality of multiple engagements exists, because in this case several tooth pairs must be synchronized with one another. This is particularly the case when the drive shaft is in multiple engagement with four pinion shafts, wherein the gear wheels of each pinion shaft are in engagement with two pinions of the driven shaft. Such an arrangement can be employed, in particular, in high-power gears for drives in wind turbines and water turbines.

Advantageously, the gear wheel of a pinion shaft may also be skewed. Skewing allows higher load bearing capacity and higher rotation speeds due to the uniform transfer under load. Moreover, the gear runs more smoothly than a straight-tooth spur wheel pair.

BRIEF DESCRIPTION OF THE DRAWING

The invention will now be described with reference to exemplary embodiments illustrated in the drawings, which show in.

DETAILED DESCRIPTION OF PREFERRED EMBODIMENTS

Figure 1:
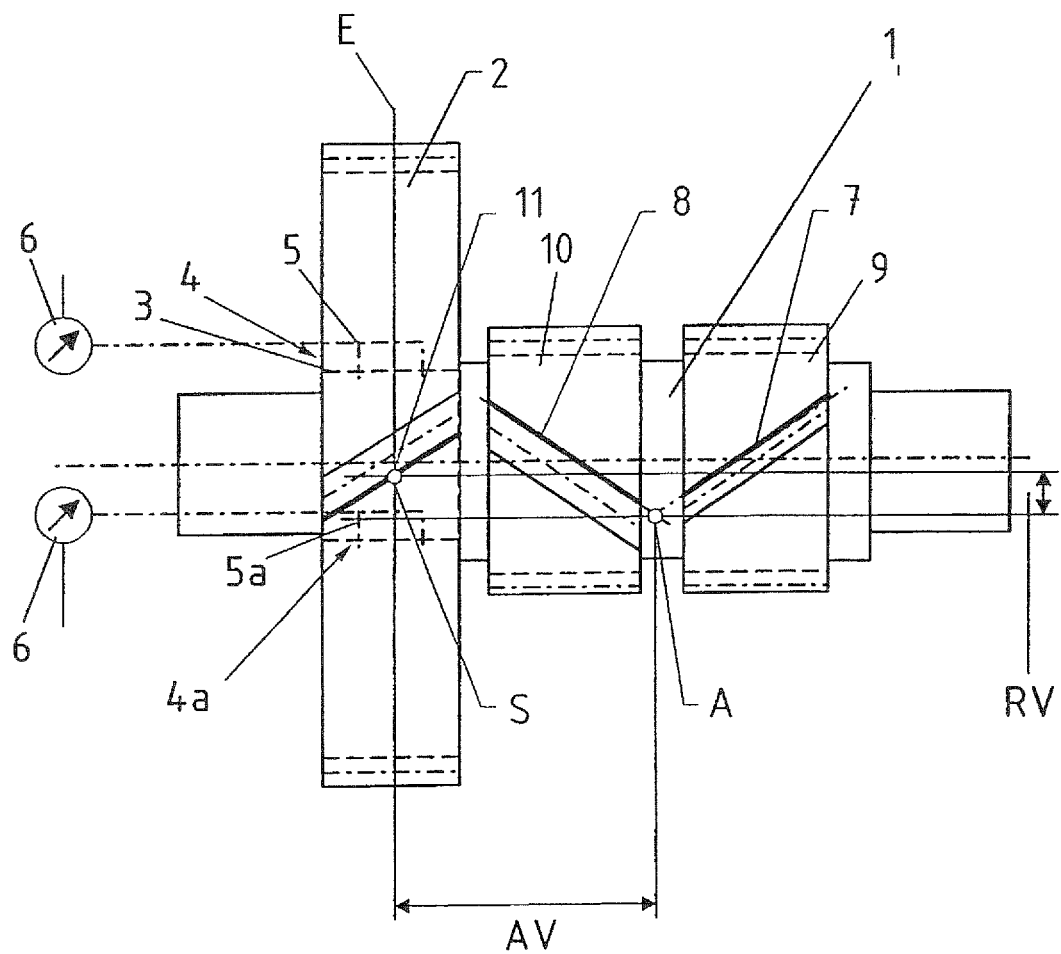
FIG. 1 a schematic diagram of a pinion shaft with a gear wheel.

FIG. 1 shows a multiple-toothed pinion shaft. The tooth structure has a double-skew. In addition, a gear wheel 2 is arranged on the pinion shaft 1. The gear wheel 2 is non-positively connected with the pinion shaft 1. The connection is formed by shrink-fitting the gear wheel 2 on the shaft seat 3. In addition, a hydraulic press fit 4, 4a is formed between the shaft seat 3 and the gear wheel 2. The alternative embodiment of the hydraulic press fit illustrated in the upper part of the image plane includes hydraulic channels 5 arranged in the gear wheel 2, which are provided to conduct a hydraulic fluid with a pumping unit 6 into the joint region between the gear wheel 2 and the shaft seat 3.

The alternative embodiment of a hydraulic press fit 4a illustrated in the lower half of the image has hydraulic channels 5a formed in the pinion shaft 1 and/or in the shaft seat 3 of the pinion shaft 1. Pressure can also be applied to these hydraulic channels 5a with a pumping unit 6 so as to temporarily relieve the non-positive connection between the gear wheel 2 and the pinion shaft 1.

The hydraulic press fit 4, 4a is intended to align the tooth faces of the gear wheel 2 with respect to the tooth faces 7, 8 of the double-skewed tooth structure. A corresponding tooth face 7, 8 is shown on each of the double-skewed pinions 9, 10 as a bold line. These are the load tooth faces of the pinions 9, 10. As can be seen, the extensions of these tooth faces 7, 8 intersect in a single point which is referred to as tooth face apex point A.

As a result of the different position and different angles of the tooth faces 7, 8, the tooth face apex point A of the double-skewed tooth structure is not exactly in the center between the pinions 9, 10. The tooth face apex point A is the most important reference quantity for the orientation of the tooth face 11 of the gear wheel 2. To determine the tooth face 11 of the gear wheel 2, which also represents a load tooth face of a helical gear, an intersecting point S of the tooth face 11 with a radial plane E is determined, which has an axial offset AV from the tooth face apex point A. The axial offset AV is preset, wherein the intersecting point S must be located within predetermined tolerances of the axial offset AV. In addition, a radial offset RV of the intersecting point S in relation to the tooth face apex point A is defined. The intersecting point S of the tooth face 11 is exactly defined by the radial offset RV and the axial offset AV. If the tooth face 11 and its intersecting point S are not within predetermined regions with respect to the axial offset AV and the radial offset RV, then pressure is applied to the hydraulic press fit 4, 4a and the gear wheel 2 is rotated into the desired position and thereafter affixed by relieving the pressure of the hydraulic press fit 4, 4a.

Figure 2:
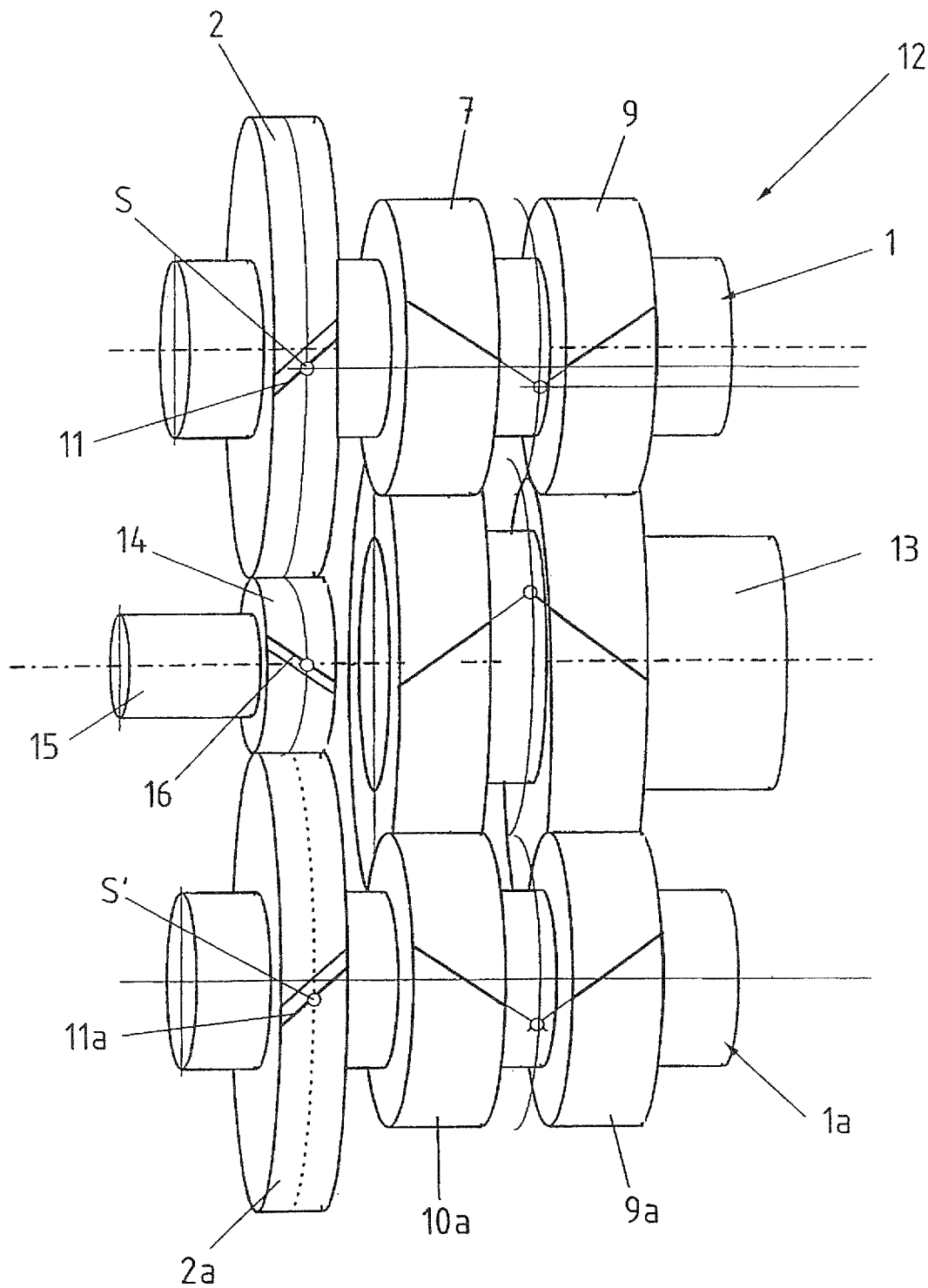
FIG. 2 a gear arrangement with two pinion shafts according to claim 1 in multiple engagement with a drive shaft and a driven shaft.

Matching of the tooth face positions is extremely important, if pinion shafts configured in this manner are to be employed in torque-split spur gears, as illustrated in the exemplary diagram of FIG. 2.

This spur gear 12 of FIG. 2 has two pinion shafts 1, 1a of the configuration described in FIG. 1. The pinions 9, 10 and 9a, 10a, respectively, of the pinion shafts 1, 1a are in engagement with a gear pair of a central drive shaft 13. Power from the drive shaft 13 is to be uniformly distributed on the pinion shafts 1, 1a, wherein the gear wheels 2, 2a of the pinion shafts are in engagement with a pinion 14 of a driven shaft 15. In this multiple torque-split spur gear 12, the drive shaft 13 as well as the driven shaft 15 are in multiple engagement with the pinion shafts 1, 1a. For uniform force transmission to the tooth faces 16 of the pinion 14 of the driven shaft 15, the gear wheels 2, 2a must be synchronized with respect to the position of their load tooth faces 11, 11a. Stated differently, timing between the gear wheels 2, 2a must match. The timing can be adjusted within the context of the invention in that an installed gear wheel 2, 2a can be rotated with respect to the position of its load faces 11, 11a even in the installed state, as illustrated in FIG. 2.

The invention claimed is:

1. A method for setting a tooth face position of a gear wheel, which is non-positively connected to a double-skewed pinion shaft, the method comprising the steps of:
    a) forming between the gear wheel and the pinion shaft a shaft seat in form of a hydraulic press fit;
    b) shrink-fitting the gear wheel onto the shaft seat to form a non-positive connection between the gear wheel and the pinion shaft;
    c) determining a tooth face apex point of the double-skewed pinion shaft;
    d) defining a radial plane extending through the teeth of the gear wheel, said radial plane having a predetermined axial offset from the tooth face apex point;
    e) determining an intersecting point of a tooth face of the gear wheel with the radial plane;
    f) applying pressure to the hydraulic press fit, thereby allowing the gear wheel to rotate relative to the pinion shaft;
    g) rotating the gear wheel into a position where the intersecting point is located with a predetermined offset in a circumferential direction of the gear wheel from the tooth face apex point; and
    h) relieving pressure from the hydraulic press fit, thereby affixing the gear wheel on the shaft seat with a rotation lock.

2. A method for setting a tooth face position of a gear wheel which is non-positively connected to a double-skewed pinion shaft, wherein the pinion shaft is installed in a torque-split spur gear, wherein two gear wheels of two torque-split pinion shafts are in common engagement with a pinion of a driven shaft, the method comprising, for each of the two torque-split pinion shafts, the steps of:
    a) determining a tooth face apex point of the double-skewed pinion shaft;
    b) defining a radial plane extending through the teeth of the gear wheel, said radial plane having a predetermined axial offset from the tooth face apex point;
    c) determining an intersecting point of a tooth face of the gear wheel with the radial plane;
    d) applying pressure to the hydraulic press fit in a region of a shaft seat of the gear wheel, thereby relieving a non-positive connection between the gear wheel and the pinion shaft, allowing the gear wheel to be rotated relative to the pinion shaft;

e) rotating the gear wheel into a position where the intersecting point is located in a predetermined offset in a circumferential direction of the gear wheel from the tooth face apex point, and;

f) relieving pressure from the hydraulic press fit, thereby affixing the gear wheel on the shaft seat with a rotation lock.

3. The method of claim 1, wherein the tooth face apex point is determined via load tooth faces.

4. The method of claim 1, wherein the tooth face for determining the intersecting point is a load tooth face.

5. The method of claim 2, wherein the tooth face apex point is determined via load tooth faces.

6. The method of claim 2, wherein the tooth face for determining the intersecting point is a load tooth face.

7. A torque-split spur gear, comprising:
a drive shaft;
a plurality of pinion shafts having a double-skewed tooth structure which is in multiple engagement with the drive shaft, with each of the plurality of pinion shafts having a gear wheel; and
a driven shaft having a pinion, said pinion in multiple engagement with a gear wheel of the plurality of pinion shafts, wherein the gear wheels are non-positively affixed on the pinion shaft with a hydraulic press fit,
wherein a position of a tooth face of the gear wheels is determined depending on a position of a tooth face apex point of tooth faces of the pinions of the double-skewed tooth structure.

8. The spur gear of claim 7, wherein a position of a load tooth face of the gear wheel is determined depending on a position of a load tooth face apex point of the tooth faces of the pinions of the double-skewed tooth structure.

9. The spur gear of claim 7, wherein the plurality of pinion shafts comprise shaft seats with hydraulic channels.

10. The spur gear of claim 7, wherein hydraulic channels are formed in a gear wheel affixed on a corresponding pinion shaft with the hydraulic press fit.

11. The spur gear of claim 7, wherein the drive shaft is in multiple engagement with four pinion shafts, wherein the gear wheels of each pinion shaft are in engagement with two pinions of the driven shaft.

12. The spur gear of claim 7, wherein the gear wheel is a skewed gear.

13. The method of claim 2, wherein the two gear wheels of the two torque-split pinion shafts are in common engagement with a pinion of a driven shaft.

* * * * *